Dec. 8, 1964 R. W. WOLLENTIN 3,160,541
METHOD OF MAKING ELECTROLUMINESCENT
DEVICE AND RESULTING PRODUCT
Filed Sept. 21, 1960

INVENTOR.
ROBERT W. WOLLENTIN
BY
W. D. Palmer
ATTORNEY.

United States Patent Office 3,160,541
Patented Dec. 8, 1964

3,160,541
METHOD OF MAKING ELECTROLUMINESCENT DEVICE AND RESULTING PRODUCT
Robert W. Wollentin, Bloomfield, N.J., assignor to Westinghouse Electric Corporation, East Pittsburgh, Pa., a corporation of Pennsylvania
Filed Sept. 21, 1960, Ser. No. 57,561
16 Claims. (Cl. 156—67)

This invention relates to a method for making an electroluminescent device and the resulting product and, more particularly, to a method for fabricating the operative phosphor-dielectric layer for an electroluminescent device, as well as the product which incorporates the formed phosphor-dielectric layer.

The phenomenon of electroluminescence was first disclosed by G. Destriau, one of his earlier publications appearing in London, Edinburgh and Dublin Philosophical Mazagine, Series 7, volume 38, No. 285, pages 700–737 (October 1947). Since this early publication, electroluminescent devices have been marketed commercially. In one construction for such devices, finely divided electroluminescent phosphor is embedded in plastic dielectric material in the form of a thin, substantially uniform phosphor-dielectric layer. This layer is sandwiched between two electrodes, at least one of which is light transmitting. There is also provided a substrate or foundation for the electroluminescent device, which foundation carries and supports the operative electrodes and the phosphor-dielectric layer.

For best initial brightness, it is preferred to embed the phosphor material in plastic dielectric. The phosphor-plastic dielectric layer desirably has as uniform a thickness as possible, in order that the exciting electric field which is applied thereacross is similarly uniform. Such phosphor-dielectric layers previously have been formed by spraying a mixture of finely divided phosphor and plastic material, the latter being dissolved in solvent. After spraying, the solvent volatilizes leaving the phosphor embedded throughout the plastic dielectric. This procedure is somewhat expensive and frequently involves multiple spraying operations, in order to provide the desired thickness for the phosphor-dielectric layer. In addition, the thickness of the resulting phosphor-dielectric layer is sometimes subject to variations because of spraying difficulties, thereby creating portions of the resulting electroluminescent device which are susceptible to electrical breakdown.

It is the general object of this invention to avoid and overcome the foregoing and other difficulties of and objections to prior-art practices by the provision of an improved method for forming a substantially uniform and adherent layer of phosphor embedded in thermoplastic dielectric material.

It is another object to provide an improved method for fabricating an electroluminescent device, wherein the device incorporates a substantially uniform and adherent layer of phosphor embedded in thermoplastic dielectric material.

It is a further object to provide an electroluminescent device which incorporates a substantially uniform layer of phosphor embedded in thermoplastic dielectric material, which phosphor-dielectric layer has been formed by an improved method.

The aforesaid objects of the invention, and other objects which will become apparent as the description proceeds, are achieved by first heating to fluid condition selected thermoplastic dielectric material and suspending finely divided electroluminescent phosphor therein. The fluid plastic and suspended phosphor are immediately cooled in order to cause the thermoplastic to solidify and embed the suspended phosphor. The resulting solid is then reduced to powdered status. The powder is applied as a substantially even layer proximate the foundation or substrate for an electroluminescent device. The foundation which carries the applied powder layer is placed in a substantially horizontal orientation and the applied powder layer is heated to cause the thermoplastic portion thereof to become fluid. This forms a substantially uniformly thick fluid thermoplastic material and suspended phosphor layer. Immediately thereafter, the fluid thermoplastic and suspended phosphor are cooled in order to cause the thermoplastic material to solidify and adhere to its support. If desired, the uppermost electrode can be affixed in place during the last heating and cooling operation. There have also been provided various alternative procedures for carrying out individual steps of the foregoing method as well as the product which results from the foregoing method.

For a better understanding of the invention, reference should be had to the accompanying drawings wherein.

Figure 1:
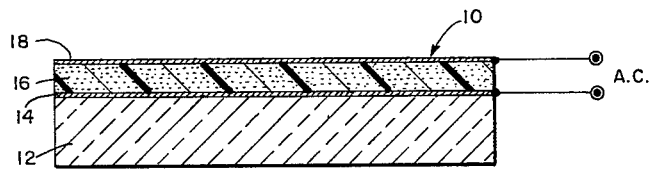
FIG. 1 is a sectional elevational view of an electroluminescent device which utilizes a light-transmitting foundation.

With specific reference to the form of the invention illustrated in the drawings, in FIG. 1 is shown an electroluminescent device 10 which generally comprises a supporting foundation 12 with a first light-transmitting electrode layer 14 carried on the foundation 12. A layer 16 is carried over the layer 14 and comprises any finely divided, solid, inorganic electroluminescent phosphor embedded in light-transmitting, thermoplastic dielectric material, and a second reflecting electrode 18 is carried over the phosphor-dielectric layer 16. An alternating electric potential is adapted to be applied across the electrodes 14 and 18 in order to energize the device to light emission. As a specific example, the foundation 12 is formed of glass. The first light-transmitting electrode 14 is formed of a thin tin oxide film. The layer 16, which has been formed in accordance with the present method, has a thickness of two mils and comprises finely divided, copper-activated zinc sulfide electroluminescent phosphor embedded in an equal part by weight of polyvinyl-chloride acetate. The second electrode 18 is formed of a reflecting metallic layer, such as aluminum. Other suitable light-transmitting, electrically conducting materials such as indium oxide or thin, transparent metal films can be used as the layer 14 and other thermoplastic dielectric materials can be substituted for the preferred polyvinyl-chloride acetate. Examples of such other light-transmitting, thermoplastic dielectric materials are polystyrene, polyethylene and polyvinyl butyral. The thickness of the layer 16 can be varied considerably, as can the respective parts by weight of plastic dielectric material and the phosphor embedded therein. The second electrode 18 can be made light transmitting if desider, such as by forming it of a thin film of copper iodide, or the electrode 18 can be formed of a metallic mesh or a thin, vacuum-metallized layer, as is often used in such devices.

Figure 2:
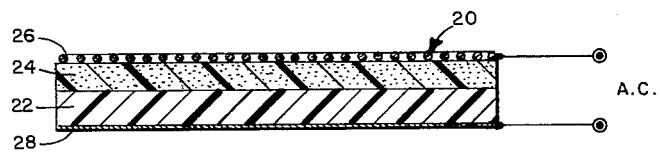
FIG. 2 is a sectional elevational view of an alternative construction for an electroluminescent device, wherein the foundation forms a portion of the dielectric between the device electrodes.

In the embodiment 20 which is shown in FIG. 2, the foundation 22 for the device forms a part of the insulating dielectric which is sandwiched between the device electrodes. As an example, the foundation 22 can be formed of a wafer of barium titanate, such as described in U.S. Patent No. 2,866,117, dated Dec. 23, 1958. The phosphor-dielectric layer 24 is generally as described for the embodiment 10, as shown in FIG. 1. The uppermost electrode 26 is formed of a light-transmitting mesh of wires, such as described in U.S. Patent No. 2,765,419, dated Oct. 2, 1956. The bottom electrode 28 is preferably formed of vacuum-metallized aluminum or silver. An alternating electric potential is adapted to be applied between the electrodes 26 and 28 in order to energize the device to light emission. The interstices between the individual conductors comprising the mesh electrode 26 serve to emit the generated light.

Figure 3:
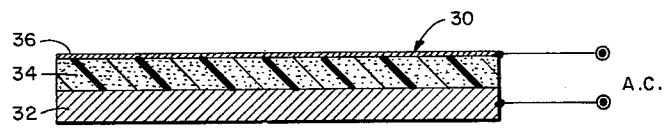
FIG. 3 is a sectional elevational view of another alternative embodiment for an electroluminescent device, wherein one electrode is formed of metal and also constitutes the foundation for the device.
Figure 4:
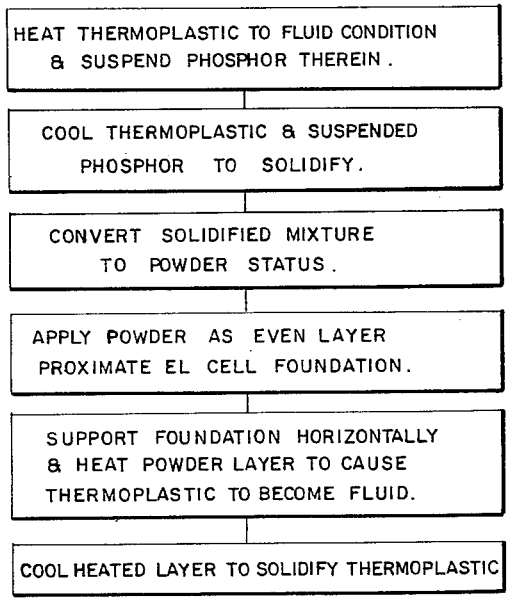
FIG. 4 is a flow chart illustrating the steps of the present method, as used in forming phosphor-dielectric layers for the electroluminescent devices.

In the embodiment 30 as shown in FIG. 3, the foundation 32 for the device is formed of a metallic plate which also serves as one electrode. Over this foundation-electrode 32 is formed the phosphor-dielectric layer 34, which is similar to the layers 16 and 24 as described hereinbefore. Over the phosphor-dielectric layer 34 is carried the second electrode 36, which is formed of light-transmitting, electrically conducting material such as copper iodide. Copper iodide electrode coatings are well known and are formed by vacuum-depositing copper onto the layer 34 and then exposing the assembly to iodine vapor in the presence of mild heat until the copper is converted to copper iodide and becomes light transmitting in nature. An alternating electric potential is adapted to be applied across the electrodes 32 and 36 to energize the device.

All of the foregoing devices can be encased in a suitable insulating material in order to prevent shock hazard and to inhibit any ingress of moisture. As a specific example, any of the devices 10, 20 and 30 can be encapsulated with a layer of epoxy resin. The foregoing electroluminescent devices are subject to further modification with respect to the electrode arrangements which are used. Essentially, all of these devices comprise spaced electrodes having included therebetween a solid, light-transmitting, thermoplastic dielectric material and embedded phosphor layer which has a substantially uniform thickness. At least one of the spaced electrodes is light transmitting, in order to pass the light which is generated.

In accordance with the present method, selected light-transmitting thermoplastic dielectric material is first heated until it is in a fluid condition. The heating atmosphere and the cooling atmosphere are preferably dry and inert, such as substantially dry nitrogen, in order to prevent any oxidation of the phosphor and any appreciable retention of moisture in the resulting mixed plastic and phosphor. The preferred thermoplastic dielectric material is polyvinyl-chloride acetate and this specific example will be considered in detail. The specified thermoplastic material is first heated to approximately 310° F. in order to cause it to become fluid. An equal part by weight of finely divided phosphor, such as copper-activated zinc sulfide electroluminescent phosphor, is blended into and suspended throughout this fluid thermoplastic material. The state of division of the phophor is not critical and is subject to considerable variation. As an example, the finely divided phosphor has an average particle diameter of about ten to twelve microns. After the phosphor is uniformly suspended, the fluid mixture is immediately cooled. This causes the thermoplastic dielectric material to solidify and embed the suspended phosphor. Thereafter, the resulting solid material is ground or shredded or otherwise converted to powdered status. The actual degree of division of the powder is not critical, but as an example, the powder has an average particle diameter of twenty to thirty microns. The converted powder thus comprises a generally uniform mixture of thermoplastic material and embedded phosphor particles.

In the preferred method for forming the phosphor-dielectric layer, the foundation portion of an electroluminescent device is placed in a substantially horizontal orientation and the powder is applied thereto as a substantially uniform layer by means of conventional knife coating. By way of further detail, the foundation for the device first has the powder layer poured thereon to a greater-than-desired thickness. The foundation is then passed under a stationary knife, which grades the phosphor-dielectric powder layer so that it has an even surface and a substantially uniform thickness. The foundation for the device is then supported in a substantially horizontal orientation, with the applied powder in turn supported by and overlaying the foundation portion of the device. Removable retaining members are fitted about the sides of the foundation and project to the top of the applied powder layer, in order to prevent the thermoplastic from running off the supporting foundation. Alternatively, the foundation is provided with a recessed portion to retain the thermoplastic when it is later heated. The foundation and supported powder are passed through an oven and heated to a temperature of 320° F. for a period of from three to seven minutes. This causes the thermoplastic material portion of the applied powder layer to become fluid, with the phosphor which was previously embedded in the powder now being suspended throughout this fluid layer. Immediately thereafter, the fluid thermoplastic material is cooled to room temperature. This causes the thermoplastic to solidify and to adhere to its support. The atmosphere in which the phosphor-plastic powder layer is heated and cooled is preferably substantially dry and inert, as previously described. The resulting formed layer thus comprises solid plastic dielectric material with phosphor embedded throughout the plastic. The thickness of the formed phosphor-plastic layer is substantially uniform and it adheres very well to its support because of the melting and cooling of the thermoplastic portion of this layer.

Fabrication of the device 10 is completed by affixing the uppermost or second electrode to the phosphor-dielectric layer 16. This electrode can be deposited by a conventional vacuum-metallizing technique, wherein aluminum or silver are vacuum metallized onto the phosphor-dielectric layer 16. Alternatively, the electrode layer 18, as shown in FIG. 1, is affixed to the phosphor-dielectric layer 16 by first forming the substantially uniform phosphor-plastic powder layer on the foundation. An electrically conducting plate is placed on top of the applied powder layer. Thereafter the applied powder layer is heated as described hereinbefore to cause the thermoplastic material portion thereof to become fluid and form a substantially uniformly thick thermoplastic material and suspended phosphor layer. The metallic plate will essentaily float on this fluid layer. Immediately thereafter, the thermoplastic material-phosphor layer is cooled to cause the thermoplastic material portion thereof to solidify and adhere both to its support and to the electrically conducting layer overlaying the thermoplastic material-phosphor layer. This completes the fabrication of the device in one operation, thereby effecting a savings in labor. A conducting mesh or a glass piece carrying thereon a light-transmitting, electrically conducting electrode layer, such as tin oxide, can be substituted for the metal plate, if the uppermost face of the device is desired to be light transmitting. Electrical connections to the resulting device are made by conventional bus bars or other known contact arrangement.

In the device embodiment 10, as shown in FIG. 1, the thermoplastic material-phosphor layer 16 is supported on and proximate the foundation 12 with an adhering electrically conducting layer of tin oxide between the foundation 12 and the layer 16. In the alternative device embodiment 20, as shown in FIG. 2, the phosphor-dielectric layer 24 is formed directly on the foundation 22 so that the foundation also constitutes a part of the dielectric material which is included between the operating electrodes. The fabrication of the device embodiment 20 is generally similar to the fabrication for the device embodiment 10, as described hereinbefore. Essentially, the phosphor-plastic powder, as previously described, is applied as a substantially uniform layer so that it overlays and is supported by the foundation 22. Thereafter, the mesh electrode 26 is placed over the phosphor-dielectric powder and the powder layer heated to cause the thermoplastic portion thereof to become fluid. The mesh electrode 26 will float on the fluid layer, which is immediately cooled in order to cause the thermoplastic portion thereof to adhere both to the foundation 22 and to the overlaying mesh electrode 26.

The fabrication of the device embodiment 30, as shown in FIG. 3, essentially corresponds to the previous embodiments, except that the foundation 32 is formed of a relatively heavy metallic plate which serves the dual function of a device foundation and one electrode. The uppermost electrode 36, such as a film of copper iodide, is applied after formation of the phosphor-dielectric layer 34. Alternatively, the electrode 36 could be formed of a light-transmitting mesh electrode 26, as used in the device embodiment 20 shown in FIG. 2.

The foregoing method is subject to considerable modification. As an example, in fabricating the device embodiment 10, as shown in FIG. 1, the substantially even phosphor-plastic powder layer, as initially supported by the foundation 12, can be heated at least in part by passing an electric current through the electrode layer 14. As an example, the electrode layer 14 has a resistivity of 200 ohms per square and a current of 0.5 amp. passed therethrough will cause this layer to heat to about 350° F. The phosphor-plastic powder can be heated entirely by such electrode heating or supplemental oven and electrode heating can be used. Alternatively, heating of the applied phosphor-plastic powder layer can be accomplished by placing the supporting foundation and applied powder layer within the influence of a high frequency electric field, in order to heat the plastic portion of the powder layer by means of dielectric heating.

Other finely divided, solid, inorganic material can be initially added to the fluid thermoplastic dielectric material to supplement the phosphor. As an example, it is disclosed in copending application S.N. 861,849, filed December 24, 1959, now U.S. Patent No. 3,054,919, by Lehmann, and owned by the present assignee, that the addition of finely divided, water-absorbent material to the phosphor will improve the maintenance of light output for the electroluminescent device which incorporates such phosphor. Such finely divided material can also be suspended with the phosphor in the fluid dielectric. Alternatively, finely divided, solid, inorganic dielectric material such as finely divided barium titanate can be suspended with the finely-divided phosphor in the fluid thermoplastic material, in order to increase the dielectric constant of the resulting formed phosphor-dielectric layer and improve the brightness of the electroluminescent device.

When the finely divided phosphor is initially suspended in the fluid dielectric, it is preferred to pour or otherwise shape the fluid dielectric and suspended phosphor into an elongated, relatively small or thin form before cooling to solidify, in order to facilitate later reduction of the solidified material to powdered status. As an example, the fluid thermoplastic and suspended phosphor can be poured or extruded or otherwise formed into sheets, film, pellets or threads, in order to facilitate later reduction to a powdered status.

As a further alternative to the foregoing method, the thermoplastic material-phosphor powder can be applied to overlay the foundation by first suspending the plastic-phosphor powder in a liquid which is not a solvent for the powder, in order to form a slurry. The formed slurry can thereafter be applied to the foundation and the liquid medium thereafter volatilized from the applied slurry. As an example, a slurry can be formed by suspending fifty grams of the formed plastic-phosphor powder in 150 cc. of a liquid medium such as distilled water, adding 0.25 to 1.5 grams of carboxymethyl cellulose or polyethylene oxide in order to increase the viscosity of the slurry. The resulting slurry is then applied to the foundation by dip coating or silk screening and the water volatilized to leave a phosphor-plastic powder coating.

The foregoing description has considered polyvinylchloride acetate thermoplastic dielectric in detail and this material has been found to be very satisfactory. As indicated hereinbefore, other thermoplastic materials can be substituted therefor. In such case, it is necessary to modify the heating temperatures slightly because of the different melting points for other thermoplastic materials. As an example, in the case polystyrene thermoplastic is used, the thermoplastic is initially heated to 375° F. and the phosphor suspended therein. The phosphor-plastic powder, as later applied to the foundation, is heated to a temperature of 395° F. for from three to ten minutes, in order to form the continuous layer of phosphor-plastic dielectric. In the case of polyethylene, a heating temperature of 315° F. can be used and in the case of polyvinyl butyral a heating temperature of 320° F. can be used.

It will be recognized that the objects of the invention have been achieved by providing an improved method for forming an electroluminescent device and a substantially uniform layer of phosphor embedded in thermoplastic dielectric material for use in an electroluminescent device. In addition, there has been provided the completed device which incorporates an adherent and substantially uniform layer of phosphor embedded in thermoplastic dielectric material, which phosphor-dielectric layer has been formed by an improved method.

While best embodiments of the invention have been illustrated and described in detail, it is to be particularly understood that the invention is not limited thereto or thereby.

I claim:

1. The method of forming and supporting on an electroluminescent device foundation, a solid light-transmitting thermoplastic dielectric material and embedded phosphor layer having a substantially uniform thickness, which method comprises, heating to a fluid condition selected light-transmitting thermoplastic dielectric material and suspending finely divided solid inorganic electroluminescent phosphor material throughout the fluid thermoplastic material, immediately cooling the heated thermoplastic material and phosphor suspended therein to cause the thermoplastic material to solidify and embed the suspended phosphor, converting to powdered status the solidified thermoplastic material and embedded phosphor to form a thermoplastic material-phosphor powder, applying the resulting powder as a substantially even layer proximate said device foundation, supporting said foundation in a substantially horizontal orientation with the applied powder layer in turn supported by and overlaying said foundation, heating the applied powder layer to cause the thermoplastic material portion thereof to become fluid and form a substantially uniformly thick fluid thermoplastic material and suspended phosphor layer, and immediately cooling the heated thermoplastic material-phosphor layer to cause the thermoplastic material portion thereof to solidify and adhere to its support.

2. The method as specified in claim 1, wherein a layer of light-transmitting electrically conducting material is carried on and adhered to said foundation, and the substantially even thermoplastic material-phosphor powder layer is applied to overlay the foundation-carried electrically conducting layer.

3. The method as specified in claim 2, wherein the layer of light-transmitting electrically conducting material is formed of tin oxide.

4. The method as specified in claim 2, wherein the thermoplastic material-phosphor powder layer applied to overlay said foundation is heated at least in part by passing electrical energy through the conducting coating carried on said foundation to create an I²R loss therein.

5. The method as specified in claim 1, wherein the substantially uniform thermoplastic material-phosphor powder layer applied to overlay said foundation is heated at least in part by placing such powder layer within the influence of a high-frequency electric field of sufficient magnitude to heat the thermoplastic material portion of the applied powder layer.

6. The method as specified in claim 1, wherein the thermoplastic material as first melted with the phosphor suspended therein is thereafter solidified in elongated form to facilitate later reduction to powdered status.

7. The method as specified in claim 1, wherein the thermoplastic material-phosphor powder is applied to overlay said foundation by means of knife coating, with said foundation maintained in a substantially horizontal orientation during such knife-coating operation.

8. The method as specified in claim 1, wherein the selected thermoplastic material is initially heated to fluid condition and thereafter cooled in a substantially dry and inert atmosphere, and wherein the applied powder layer is heated and thereafter cooled in a substantially dry and inert atmosphere to cause the thermoplastic portion thereof first to become fluid and then to become solid.

9. The method as specified in claim 1, wherein the thermoplastic material-phosphor powder layer is applied to overlay said foundation by first suspending the thermoplastic material-phosphor powder in a liquid which is not a solvent for such powder to form a slurry, thereafter applying the formed slurry to said foundation, and volatilizing the liquid medium from the applied slurry.

10. The method as specified in claim 9, wherein the resulting slurry is applied to overlay said foundation by a dip coating process.

11. The method as specified in claim 9, wherein the resulting slurry is applied to overlay said foundation by silk screening the slurry onto said foundation.

12. The method of forming and supporting on an electroluminescent device foundation, a solid light-transmitting thermoplastic dielectric material and embedded phosphor layer having a substantially uniform thickness, which method comprises, heating to a fluid condition selected light-transmitting thermoplastic dielectric material and suspending finely-divided solid inorganic electroluminescent phosphor throughout the fluid thermoplastic material, immediately cooling the heated thermoplastic material and phosphor suspended therein to cause the thermoplastic material to solidify and embed the suspended phosphor, reducing to powdered status the solidified thermoplastic material and embedded phosphor to form a thermoplastic material-phosphor powder, applying the resulting powder as a substantially even layer proximate said device foundation, supporting said foundation in a substantially horizontal orientation with the applied powder layer in turn supported by and overlaying said foundation, placing an electrically conducting layer to overlay the applied powder layer, heating the applied powder layer to cause the thermoplastic material portion thereof to become fluid and form a substantially uniformly thick fluid thermoplastic material and suspended phosphor layer, and immediately cooling the heated thermoplastic material-phosphor layer to cause the thermoplastic material portion thereof to solidify and adhere both to its support and to the electrically conducting layer overlaying the thermoplastic material-phosphor layer.

13. The method as specified in claim 12, wherein a layer of light-transmitting electrically conducting material is carried on and adhered to said foundation, and the substantially even thermoplastic material-phosphor powder layer is applied to overlay the foundation-carried electrically conductive layer.

14. The method as specified in claim 13, wherein the electrically conducting layer placed to overlay the applied powder layer is a metal plate.

15. The method as specified in claim 12, wherein the electrically conducting layer placed to overlay the applied powder layer is light transmitting.

16. The method as specified in claim 15, wherein the electrically conducting layer placed to overlay the applied powder layer is formed of an electrically conducting mesh.

References Cited in the file of this patent

UNITED STATES PATENTS

| | | |
|---|---|---|
| 2,798,821 | Lehmann | July 9, 1957 |
| 2,844,540 | Rulon | July 22, 1958 |
| 2,900,271 | McIntyre | Aug. 18, 1959 |